US012197713B2

(12) United States Patent
Sil et al.

(10) Patent No.: US 12,197,713 B2
(45) Date of Patent: Jan. 14, 2025

(54) GENERATING AND APPLYING EDITING PRESETS

(71) Applicant: Adobe Inc., San Jose, CA (US)

(72) Inventors: Arnab Sil, Hooghly (IN); Subham Gupta, Roorkee (IN); Anuradha, Bengaluru (IN)

(73) Assignee: Adobe Inc., San Jose, CA (US)

( * ) Notice: Subject to any disclaimer, the term of this patent is extended or adjusted under 35 U.S.C. 154(b) by 413 days.

(21) Appl. No.: 17/592,341

(22) Filed: Feb. 3, 2022

(65) Prior Publication Data
US 2023/0244368 A1    Aug. 3, 2023

(51) Int. Cl.
| | |
|---|---|
| *G06F 3/04845* | (2022.01) |
| *G06F 3/0482* | (2013.01) |
| *G06T 7/11* | (2017.01) |
| *G06V 10/764* | (2022.01) |
| *G06V 20/50* | (2022.01) |

(52) U.S. Cl.
CPC ........ *G06F 3/04845* (2013.01); *G06F 3/0482* (2013.01); *G06T 7/11* (2017.01); *G06V 10/764* (2022.01); *G06V 20/50* (2022.01); *G06T 2200/24* (2013.01)

(58) Field of Classification Search
None
See application file for complete search history.

(56) References Cited

U.S. PATENT DOCUMENTS

| | | | |
|---|---|---|---|
| 2020/0026949 A1* | 1/2020 | Alcock | G06F 16/532 |
| 2021/0082091 A1* | 3/2021 | Jirsa | G06T 5/90 |
| 2021/0297582 A1* | 9/2021 | Brown | H04N 23/80 |

OTHER PUBLICATIONS

Take Better Photos, How To Use Photomator 2.3 AI Masks for Better Raw Editing https://www.youtube.com/watch?v=l59tayhaRP4 Apr. 21, 2023 (Year: 2023).*
Anthony Turnham, "How To Create the Perfect Preset! Make a universal preset that will enhance ANY photo in Luminar!" https://www.youtube.com/watch?app=desktop&v=1qZEVuXsxAQ Jul. 1, 2020 (Year: 2020).*

* cited by examiner

*Primary Examiner* — Randolph I Chu
(74) *Attorney, Agent, or Firm* — FIG. 1 Patents

(57) ABSTRACT

In implementations of systems for generating and applying editing presets, a computing device implements a preset system to detect objects depicted in a digital image that is displayed in a user interface of an application for editing digital content. Input data is received describing an edited region of the digital image and properties of an editing operation performed in the edited region. The preset system identifies a particular detected object of the detected objects based on a bounding box of the particular detected object and an area of the edited region. An additional digital image is edited by applying the properties of the editing operation to a detected object that is depicted in the additional digital image based on a classification of the detected object and a classification of the particular detected object.

20 Claims, 10 Drawing Sheets
(6 of 10 Drawing Sheet(s) Filed in Color)

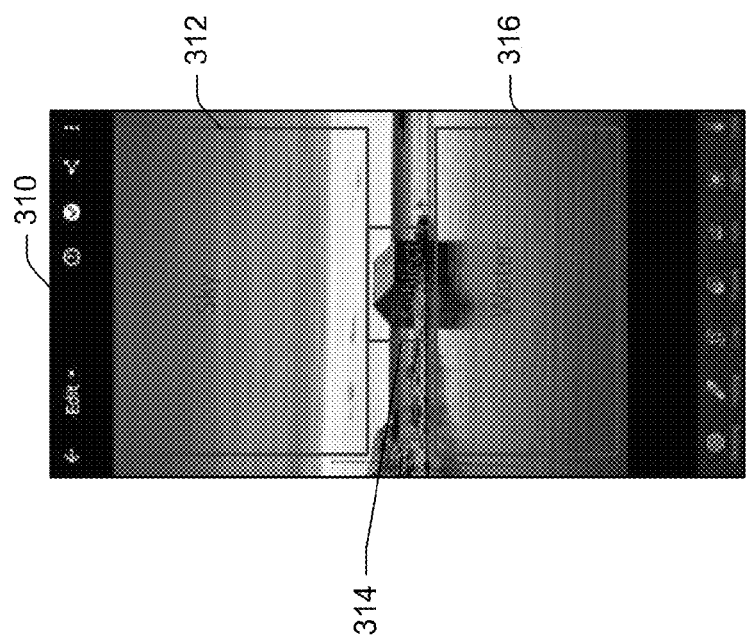
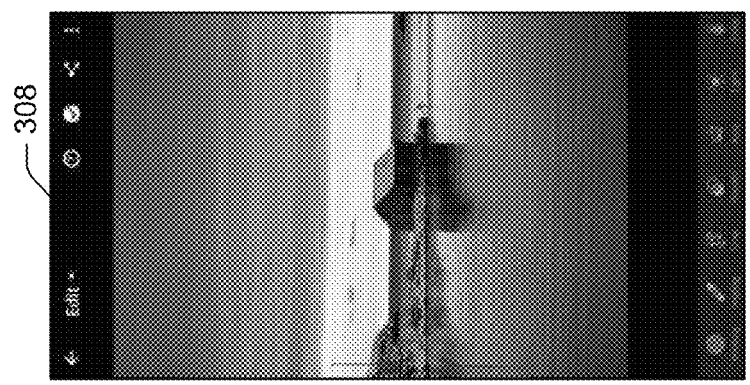
Fig. 3A

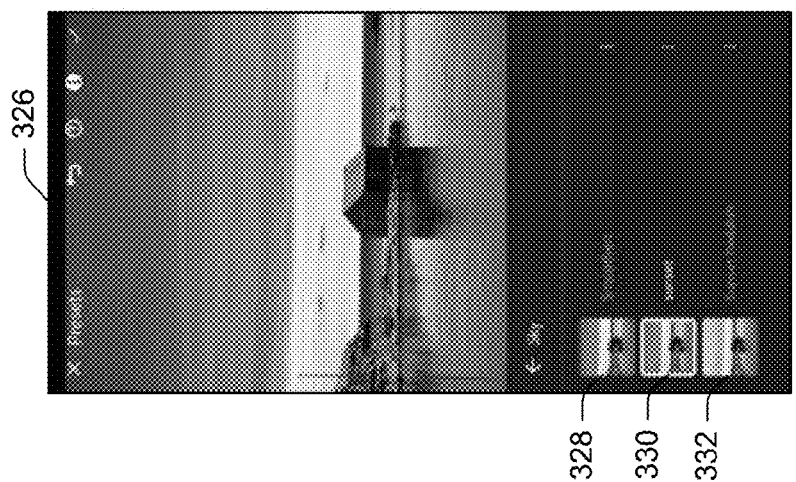

400

402
Detect objects depicted in a digital image that is displayed in a user interface of an application for editing digital content

404
Receive input data describing an edited region of the digital image and properties of an editing operation performed in the edited region

406
Identify a particular detected object of the detected objects based on a bounding box of the particular detected object and an area of the edited region

408
Edit an additional digital image by applying the properties of the editing operation to a detected object that is depicted in the additional digital image based on a classification of the detected object and a classification of the particular detected object

Fig. 4

GENERATING AND APPLYING EDITING PRESETS

BACKGROUND

Applications for editing digital images such as digital photographs often include large sets of editing controls with settings that are adjustable to modify a visual appearance of a digital image. For instance, settings of an exposure editing control are adjustable to modify a brightness of the digital image, settings of a contrast editing control are adjustable to increase or decrease an amount of contrast depicted in the digital image, and so forth. The settings of the editing controls are adjustable manually (e.g., via interaction with an input device to specify particular settings) or automatically using an editing preset.

An editing preset is a group of pre-defined settings of specific editing controls of an application for editing digital images that is usable to apply a particular visual feature to the digital image. For example, editing presets are usable to avoid manually reproducing a same visual feature in multiple digital images or to maintain a consistent visual theme in a group of digital images. Conventional systems for applying pre-defined settings of an editing preset to a digital image are limited to applying the pre-defined settings globally to the entire digital image.

For example, a digital image depicts a first portion which is visually pleasing and a second portion which is too dark. The digital image is edited using an editing preset for brightening digital images to improve a visual appearance of the second portion. After this editing, the second portion is now visually pleasing, but the first portion is too bright. Accordingly, the inability to apply the editing preset locally to the second portion (e.g., without applying the editing preset to the first portion) is a shortcoming of conventional systems for applying editing presets.

SUMMARY

Techniques and systems are described for generating and applying editing presets. In an example, a computing device implements a preset system to detect objects depicted in a digital image that is displayed in a user interface of an application for editing digital content. Input data is received describing an edited region of the digital image and properties of an editing operation performed in the edited region. For example, the edited region is segmented using a type of machine learning based mask and the properties of the editing operation are settings of editing controls of the application for editing digital content.

In one example, the preset system identifies a particular detected object of the detected objects based on a bounding box of the particular detected object and an area of the edited region. An additional digital image is edited by applying the properties of the editing operation to a detected object that is depicted in the additional digital image based on a classification of the detected object and a classification of the particular detected object. For example, the properties of the editing operation are applied locally to the detected object in the additional digital image.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The detailed description is described with reference to the accompanying figures. Entities represented in the figures are indicative of one or more entities and thus reference is made interchangeably to single or plural forms of the entities in the discussion.

FIGS. 3A, 3B, 3C, and 3D illustrate examples of generating and applying editing presets.

FIG. 4 is a flow diagram depicting a procedure in an example implementation in which input data is received describing properties of an editing operation performed in an edited region of a digital image and the properties of the editing operation are applied to a detected object that is depicted in an additional digital image.

DETAILED DESCRIPTION

Overview

Figure 1:
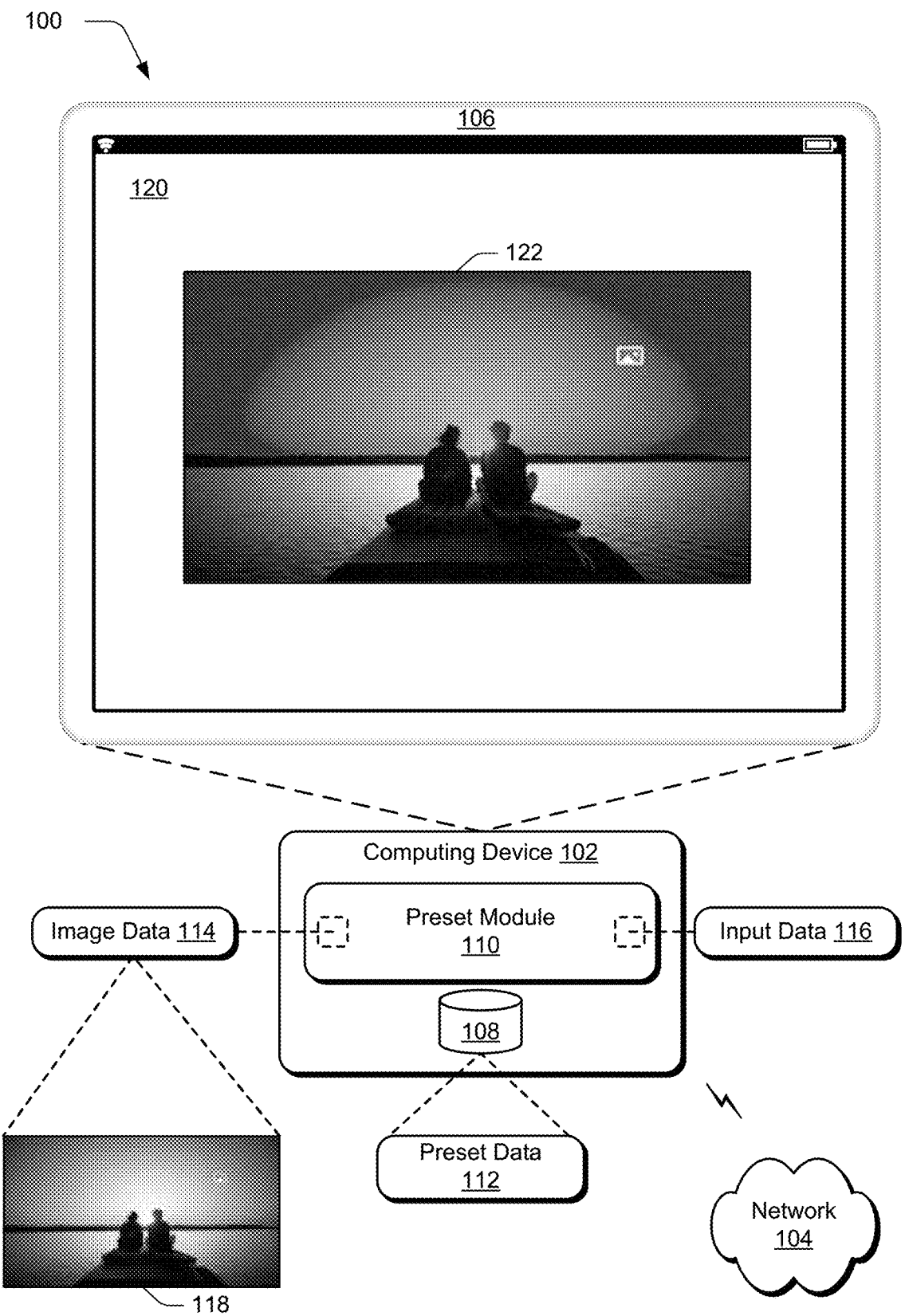
FIG. 1 is an illustration of an environment in an example implementation that is operable to employ digital systems and techniques for generating and applying editing presets as described herein.

A digital image such as a digital photograph is editable using an application for editing digital content, for example, by adjusting settings of editing controls of the application to change a visual appearance of the digital image. Examples of editing controls include exposure, contrast, sharpness, hue, saturation, luminance, etc. Settings of the editing controls are specified to edit the digital image which is performed manually such as by a user interacting with an input device relative to a user interface of the application for editing digital content or automatically using a preset.

A preset includes pre-defined settings of particular editing controls and the application for editing digital content applies the pre-defined settings to the particular editing controls to edit the digital image. Conventional systems for editing a digital image using a preset are limited to applying pre-defined settings of the preset globally to the entire digital image. This limitation is particularly undesirable in scenarios in which pre-defined settings of a preset improve a visual appearance of a first portion of a digital image (e.g., a portion depicting a sky) but cause a second portion of the digital image (e.g., a portion depicting mountains) to appear unnatural and visually displeasing.

In order to overcome the limitations of conventional systems, techniques and systems are described for generating and applying editing presets. In one example, a computing device implements a preset system to detect objects depicted in a digital image that is displayed in a user interface of an application for editing digital content. For example, the preset system detects the objects using a machine learning model trained on training data to receive an image depicting objects as an input and generate a classification (e.g., a label vector), a bounding box, and a confidence score for each of the objects as an output.

To generate a preset, a user interacts with an input device (e.g., a mouse, a stylus, a touchscreen, a keyboard, etc.) relative to the user interface of the application for editing digital content to select an object depicted in the digital image using a type of machine learning based mask that is available as part of digital content editing functionality provided by the application for editing digital content. Examples of types of machine learning based masks available via the application include a sky select mask, an object select mask, a subject select mask, a skin select mask, and so forth. For example, the user manipulates the input device relative to the user interface to select or segment a sky object depicted in the digital image using a sky select machine learning based mask.

After selecting the sky object using the sky select machine learning based mask, the user manipulates the input device relative to the user interface to perform an editing operation on the sky object, e.g., to improve a visual appearance of the sky object in the digital image. The preset system receives input data describing an edited region of the digital image and properties of the editing operation performed on the sky object. For example, the edited region is defined by the sky select machine learning based mask and the properties of the editing operation are settings of editing controls of the application for editing digital content specified to edit the sky object.

The preset system generates a preset for the sky object by encoding the specified settings of the editing controls in an extensible metadata platform document in some examples. It is to be appreciated that in other examples, the preset system is capable of encoding the settings of the editing controls using other types of documents and/or other formats. For example, the extensible metadata platform document includes an indication of the type of machine learning based mask used to select the sky object as "sky select" as well as an indication of a classification of the sky object as "sky" based on the label vector generated for the sky object.

The preset system includes the generated preset for the sky object in preset data that describes presets for editing digital images which is available to the preset system and/or the application for editing digital content. The user interacts with the input device relative to the user interface to display an additional digital image in the user interface that depicts additional objects. For example, the additional digital image depicts an additional sky object and a mountain object.

The preset system detects the objects depicted in the additional digital image and generates a bounding box, a label vector, and a confidence score for the additional sky object and the mountain object. For instance, the label vector for the additional sky object classifies the object as "sky" and the label vector for the mountain object classifies the object as "mountain." The preset system uses the classifications of the additional sky object and the mountain object to determine relevant presets described by the preset data for editing the objects depicted in the additional digital image.

To do so in one example, the preset system compares the label vector "mountain" for the mountain object to indications of classifications of objects edited to generate the presets described by the preset data. For example, the preset system includes presets that have an indication of a classification of an object that matches the label vector "mountain" in a list of relevant presets which the preset system displays in the user interface. With respect to the preset for the sky object, the preset system compares the label vector "mountain" to the indication of the classification of "sky" included in the extensible metadata platform document which is not a match. However, the preset system identifies a match between the label vector of "sky" for the additional sky object and the indication of the classification of "sky" included in the extensible metadata platform document.

The preset system determines that the preset for the sky object is a relevant preset for editing the additional sky object, and the preset system displays an indication of the preset for the sky object in the user interface of the application for editing digital content. The user manipulates the input device relative to the user interface to interact with the indication of the preset for the sky object. In response to this interaction, the preset system identifies a type of machine learning based mask as "sky select" from the indication included in the extensible metadata platform document.

The preset system selects the additional sky object in the additional digital image using the sky select machine learning based mask. After selecting the additional sky object, the preset system applies the settings of the editing controls encoded in the extensible metadata platform document to the additional sky object to edit the additional digital image. By leveraging the indication of the sky select machine learning based mask and the classification of the sky object included in the preset for the sky object in this way, the settings of the editing controls are applied locally to the additional sky object (e.g., and not to the mountain object) which is not possible in conventional systems that are limited to applying presets to digital images globally.

Moreover, the described systems are usable to apply pre-defined settings of relevant presets to objects depicted in groups of digital images automatically and without user intervention. For example, the user interacts with the input device to apply the preset for the sky object to relevant objects depicted in a group of digital images. In this example, the preset system detects objects in digital images included in the group and applies the settings of the editing controls encoded in the extensible metadata platform document to objects classified as "sky" without editing other objects depicted in the digital images. This is also not possible using conventional systems that are limited to applying predefined settings of a preset globally to an entire digital image.

In the following discussion, an example environment is first described that employs examples of techniques described herein. Example procedures are also described which are performable in the example environment and other environments. Consequently, performance of the example procedures is not limited to the example environment and the example environment is not limited to performance of the example procedures.

Example Environment

FIG. 1 is an illustration of an environment 100 in an example implementation that is operable to employ digital systems and techniques as described herein. The illustrated environment 100 includes a computing device 102 connected to a network 104. The computing device 102 is configurable as a desktop computer, a laptop computer, a mobile device (e.g., assuming a handheld configuration such as a tablet or mobile phone), and so forth. Thus, the computing device 102 is capable of ranging from a full resource device with substantial memory and processor resources (e.g., personal computers, game consoles) to a low-resource device with limited memory and/or processing resources (e.g., mobile devices). In some examples, the computing device 102 is representative of a plurality of different devices such as multiple servers utilized to perform operations "over the cloud."

The illustrated environment 100 also includes a display device 106 that is communicatively coupled to the computing device 102 via a wired or a wireless connection. A variety of device configurations are usable to implement the computing device 102 and/or the display device 106. The computing device 102 includes a storage device 108 and a preset module 110. The storage device 108 is illustrated to include preset data 112.

For example, the preset data 112 describes presets for editing digital images such as digital photographs. Each preset is a group of pre-defined settings of adjustable editing controls of an application for editing digital content that are usable to apply a particular visual feature to a digital image or an object depicted in the digital image. Examples of adjustable editing controls include brightness, contrast, hue, saturation, luminance, and so forth.

The preset module 110 is illustrated as having, receiving, and/or transmitting image data 114 and input data 116. The image data 114 describes a digital image 118. As shown, the digital image 118 is a digital photograph that depicts two people watching a sunset while sitting on a dock over a body of water. The input data 116 describes user interactions in a user interface 120 for generating and applying editing presets. For example, the user interface 120 is a user interface of the application for editing digital content and the digital image 118 is displayed in the user interface of the application for editing digital content.

In an example, a user interacts with an input device (e.g., a mouse, a stylus, a keyboard, a touchscreen, a microphone, etc.) relative to the user interface 120 to generate the input data 116 as describing edits to the digital image 118. In this example, the user manipulates the input device relative to the user interface 120 to select an object depicted in the digital image 118 using a particular type of machine learning based mask (e.g., a subject select, a sky select, an object select, a skin select, etc.). The particular type of machine learning based mask is available as part of digital content editing functionality provided by the application for editing digital content. For instance, the application for editing digital content implements a machine learning model trained on training data to generate masks for particular classes of objects depicted in digital images.

For example, a sky select machine learning based mask segments or selects a sky object depicted in the digital image 118. In this example, the application for editing digital content generates the sky select machine learning based mask using a machine learning model trained on training data to receive a digital image that depicts a sky object as an input and generate a mask that segments the sky object from other objects depicted in the digital image as an output. Once the sky object is segmented or selected using the sky select machine learning based mask, the sky object is editable (e.g., via interaction with the input device relative to the user interface 120) locally within the digital image 118 such that settings of adjustable editing controls are modifiable to alter a visual appearance of the sky object without altering a visual appearance of other objects depicted in the digital image 118.

Additionally, once the sky object is segmented or selected using the sky select machine learning based mask, a preset described by the preset data 112 is capable of being applied to the sky object to change a visual appearance of the sky object without changing a visual appearance of the other objects depicted in the digital image 118. In a manner that is similar to the sky select machine learning based mask, a subject select machine learning based mask is useable to segment subject objects depicted in digital images, an object select machine learning based mask is usable to segment various objects depicted in digital images, a skin select machine learning based mask is usable to segment a variety of types of skin depicted in digital images, etc. Examples of types of skin selectable using the skin mask include eyes, hair, lips, beards, teeth, clothes, backgrounds, and so forth.

In order to facilitate generating and applying editing presets, the preset module 110 processes the image data 114 to detect and identify objects depicted in the digital image 118 using a machine learning model trained on training data to detect and classify objects depicted in digital images. In one example, the preset module 110 generates a bounding box, a label vector, and a confidence score for each object detected in the digital image 118 using the machine learning model trained to detect and classify objects depicted in digital images. In this example, the preset module 110 generates a bounding box and a label vector (e.g., as "person") for each of the two people, a bounding box and label vector (e.g., as "sky") for a sky of depicted in the digital image 118, and a bounding box and a label vector (e.g., as "water") for the body of water. For example, the bounding boxes provide an indication of where the objects are located within the digital image 118 and the label vectors provide a classification of the objects depicted in the digital image 118.

The preset module 110 leverages the generated bounding boxes and label vectors to support a variety of functionality as part of generating and applying editing presets. For example, the user interacts with the input device relative to the user interface 120 to apply a preset described by the preset data 112 to an object depicted in the digital image 118. In this example, the preset module 110 processes the preset data 112 to identify relevant presets to apply to the detected objects in the digital image 118 based on the generated label vectors (e.g., the classifications of the objects depicted in the digital image 118).

For instance, each preset described by the preset data 112 is associated with a particular type of machine learning based mask of the machine learning based masks available via the application for editing digital content. Additionally, each preset described by the preset data 112 includes object information (e.g., based on a label vector of a particular type of object that is selected using the particular type of machine learning based mask and then edited to generate the preset). Also, each preset described by the preset data 112 is included in a preset group that organizes the presets. In one example, all presets generated for a particular object are included in a same preset group.

For example, each of the presets described by the preset data 112 is defined using an extensible metadata platform document which includes an indication of the particular type of machine learning based mask, an indication of the object information, and the preset group name In order to identify the relevant presets to apply to the detected objects in the digital image 118, the preset module 110 compares the generated label vectors (e.g., "person," "sky," and "water") with the indication of the object information for each of the presets described by the preset data 112. The preset module 110 includes each preset with object information that matches one of the generated label vectors in a list of relevant presets which is organized based on unique preset group names. In one example, the preset module 110 displays indications of the relevant presets in the user interface 120.

Consider an example in which the user interacts with the input device relative to the user interface 120 to select the sky object (e.g., using the sky select machine learning based mask or manipulating the input device relative to the user interface 120 to select the sky object), and the preset module 110 displays indications of relevant presets described by the preset data 112 for editing the sky object in the user interface 120. In this example, the user manipulates the input device to select an indication of a particular relevant preset. The preset module 110 receives the input data 116 as describing the selection of the particular relevant preset. The preset module 110 processes the input data 116 to apply the particular relevant preset to the sky object in the digital image 118 and generate a modified digital image 122 which is displayed in the user interface 120. As shown, pre-defined settings of the particular relevant preset are applied to the sky object in the digital image 118 to generate the modified digital image 122 as depicting the sunset with an improved a visual appearance compared to the sunset depicted in the digital image 118.

Consider another example in which the particular relevant preset that improves the visual appearance of the sunset is not included in the preset data 112. In this example, the user interacts with the input device relative to the user interface 120 to generate the modified digital image 122 by manually editing the digital image 118 to improve the visual appearance of the sunset. For instance, the user selects the sky object depicted in the digital image 118 using the sky select machine learning based mask and manipulates the input device relative to the selected sky object to generate the modified digital image 122 by editing the digital image 118.

For example, the user edits the digital image 118 by manually adjusting settings of the adjustable editing controls of the application for editing digital content to generate the modified digital image 122. After manually adjusting the settings of the adjustable editing controls such that the sunset has the improved visual appearance, the user interacts with the input device relative to the user interface 120 to generate a preset for the manually adjusted settings (e.g., the particular relevant preset from the previous example). The preset module 110 receives the input data 116 describing edits of the sky object performed using the sky select machine learning based mask. In one example, the preset module 110 displays a user interface element in the user interface 120 for generating presets and the user manipulates the input device to interact with the user interface element which causes the preset module 110 to generate the preset for the manually adjusted settings.

To do so in one example, the preset module 110 generates an extensible metadata platform document that encodes the manually adjusted settings and also includes an indication of the sky select machine learning based mask based on the input data 116. The preset module 110 additionally includes an indication of object information in the generated extensible metadata platform document. For example, the preset module 110 determines the object information based on the generated "sky" label vector which classifies the sky object. In another example, the preset module 110 displays an input field in the user interface 120, and the user interacts with the input device to specify the object information in the input field. Regardless of whether the object information is determined based on the generated label vectors or specified via the input field, the preset module 110 determines a preset group of the preset for the manually adjusted settings.

In one example, the preset module 110 determines a preset group for a preset based on a type of machine learning based mask used to select and edit an object to generate the preset. In the previous example, the sky select machine learning based mask is used to select the sky object and the preset module 110 determines a preset group name as "sky" based on the sky select machine learning based mask. The preset module 110 includes the preset group name in the extensible metadata platform document and then includes the extensible metadata platform document in the preset data 112.

Since the preset data 112 describes the preset for the manually adjusted settings, the user is capable of manipulating the input device relative to the user interface 120 to apply the preset for the manually adjusted settings to the digital image 118 and generate the modified digital image 122 without having to manually adjust the settings a second time. Moreover, the preset for the manually adjusted settings is usable to apply the manually adjusted settings to an additional digital image to improve a visual appearance of an object (e.g., a sunset) depicted in the additional digital image. For example, the preset module 110 detects objects depicted in the additional digital image and generates a bounding box, a label vector, and confidence score for each object detected in the additional digital image. In this example, the preset module 110 processes the preset data 112 that describes the extensible metadata platform document that encodes the manually adjusted settings to identify the particular type of machine learning based mask as the sky select machine learning based mask and identifies the object information as indicating "sky." The object information indicates a classification of an object edited to generate the preset for the manually adjusted settings and the label vectors indicate a classification for a corresponding object depicted in the additional digital image.

For instance, the preset module 110 compares the object information that indicates "sky" from the extensible metadata platform document that encodes the manually adjusted settings with the label vectors generated for the objects depicted in the additional digital image. For each of the objects depicted in the additional digital image that has a corresponding "sky" label vector, the preset module 110 selects the object using the sky select machine learning based mask and then applies the preset for the manually adjusted settings to the selected object. In some examples, the user interacts with the input device relative to the user interface 120 to confirm that an application of the preset for the manually adjusted settings to an object depicted in the additional digital image improves a visual appearance of the object. In other examples, the preset module 110 applies the preset for the manually adjusted settings to each object depicted in the additional digital image that has a corresponding "sky" label vector automatically and without user intervention. For example, the preset module 110 is capable of applying the preset for the manually adjusted settings to relevant objects depicted in multiple different additional digital images simultaneously and without user intervention.

Consider an example in which the user interacts with the input device relative to the user interface 120 to edit digital images included in a group of digital images and the digital image 118 is included in the group of digital images. The user manipulates the input device relative to the user interface 120 to edit the digital image 118 by manually adjusting settings of the adjustable editing controls of the application for editing digital content to generate the modified digital image 122. In a first example, the user interacts with the input device relative to the user interface 120 to generate a preset for the manually adjusted settings which includes the "sky" classification in the object information of the extensible metadata platform document that encodes the manually adjusted settings. In this first example, the preset module 110 generates a bounding box and a classification (a label vector) for each object depicted in every digital image included in the group of digital images. The preset module 110 then applies the preset for the manually adjusted settings to each object which includes a "sky" classification and is depicted in a digital image that is included in the group of digital images automatically and without user intervention.

In a second example, the user interacts with the input device relative to the user interface 120 to "copy" the manually adjusted settings. The user then manipulates the input device relative to the user interface 120 such as by interacting with a user interface element displayed by the preset module 110 to "paste" the manually adjusted settings relative to a subset of the digital images included in the group of digital images. In this second example, the preset module 110 generates a bounding box and a classification (a label vector) for each object depicted in each digital image included in the subset of the digital images. The preset module 110 then applies the preset for the manually adjusted settings to each object with includes a "sky" classification and is depicted in a digital image that is included in the subset of the digital images automatically and without user intervention.

Figure 2:
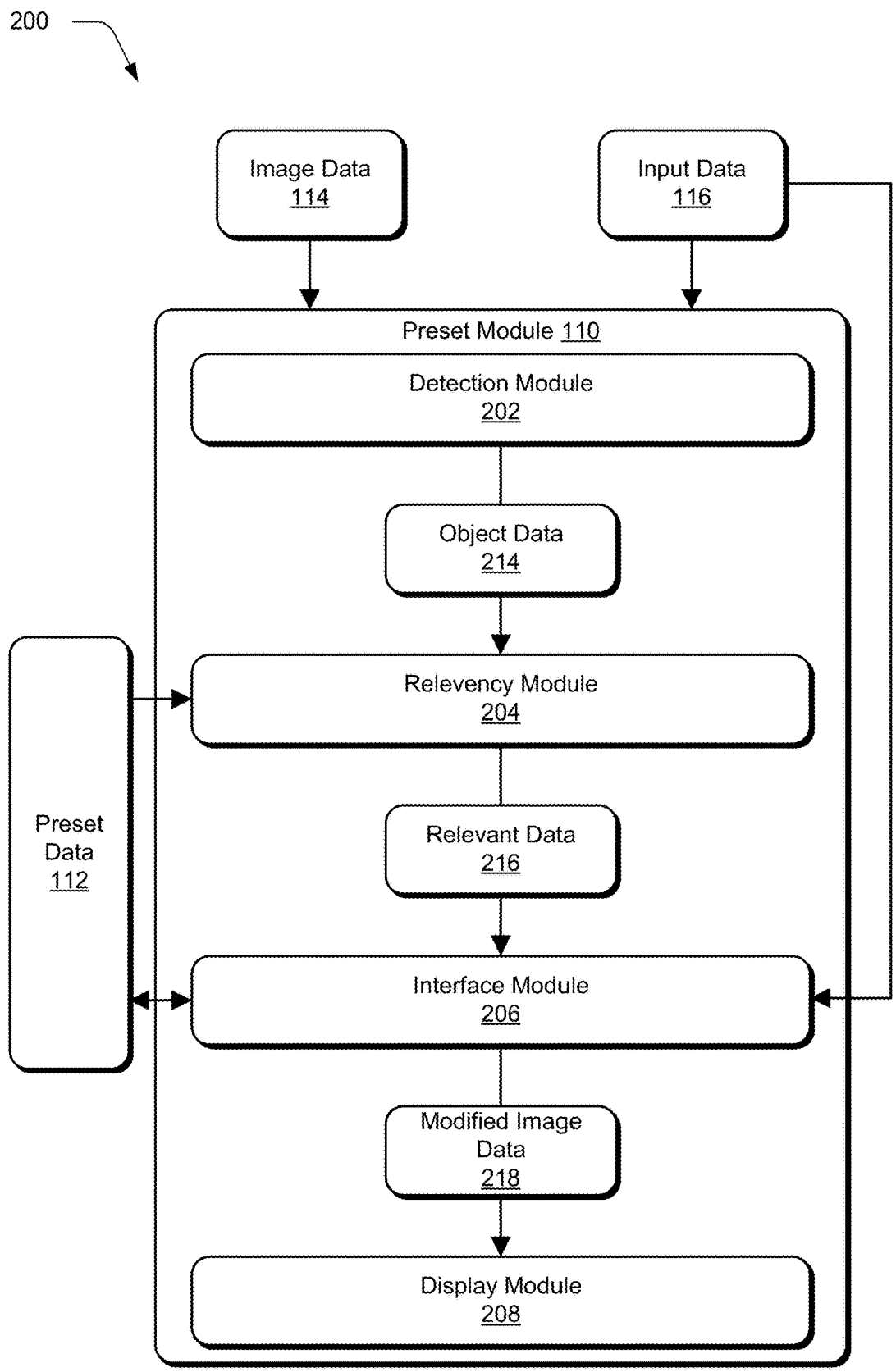
FIG. 2 depicts a system in an example implementation showing operation of a preset module for generating and applying editing presets.

FIG. 2 depicts a system 200 in an example implementation showing operation of a preset module 110. The preset module 110 is illustrated to include a detection module 202, a relevancy module 204, an interface module 206, and a display module 208. The preset module 110 receives the image data 114 which describes a digital image that is displayed in a user interface of an application for editing digital content. The preset module 110 also receives the input data 116 which describes user interactions with an input device (e.g., a mouse, a stylus, a touchscreen, a keyboard, a microphone, and so forth) relative to the user interface of the application for editing digital content.

As shown, the preset module 110 has, receives, and/or transmits the preset data 112 that describes presets for editing digital images. In an example, each of the presets described by the preset data 112 includes pre-defined settings of adjustable editing controls of the application for editing digital content that are usable to apply a particular visual feature to a digital image or an object depicted in the digital image. In one example, each preset described by the preset data 112 is an extensible metadata platform document that encodes the pre-defined settings of the adjustable editing controls. In this example, each extensible metadata platform document includes an indication of a type of machine learning based mask, an indication of object information, and an indication of a preset group. The object information is a classification of an object that is selected or segmented within a digital image using the type of machine learning based mask and then edited to generate a particular preset. The preset group is a name of a specific preset group that includes the particular preset and the preset groups organize the presets described by the preset data 112.

Figure 3B:
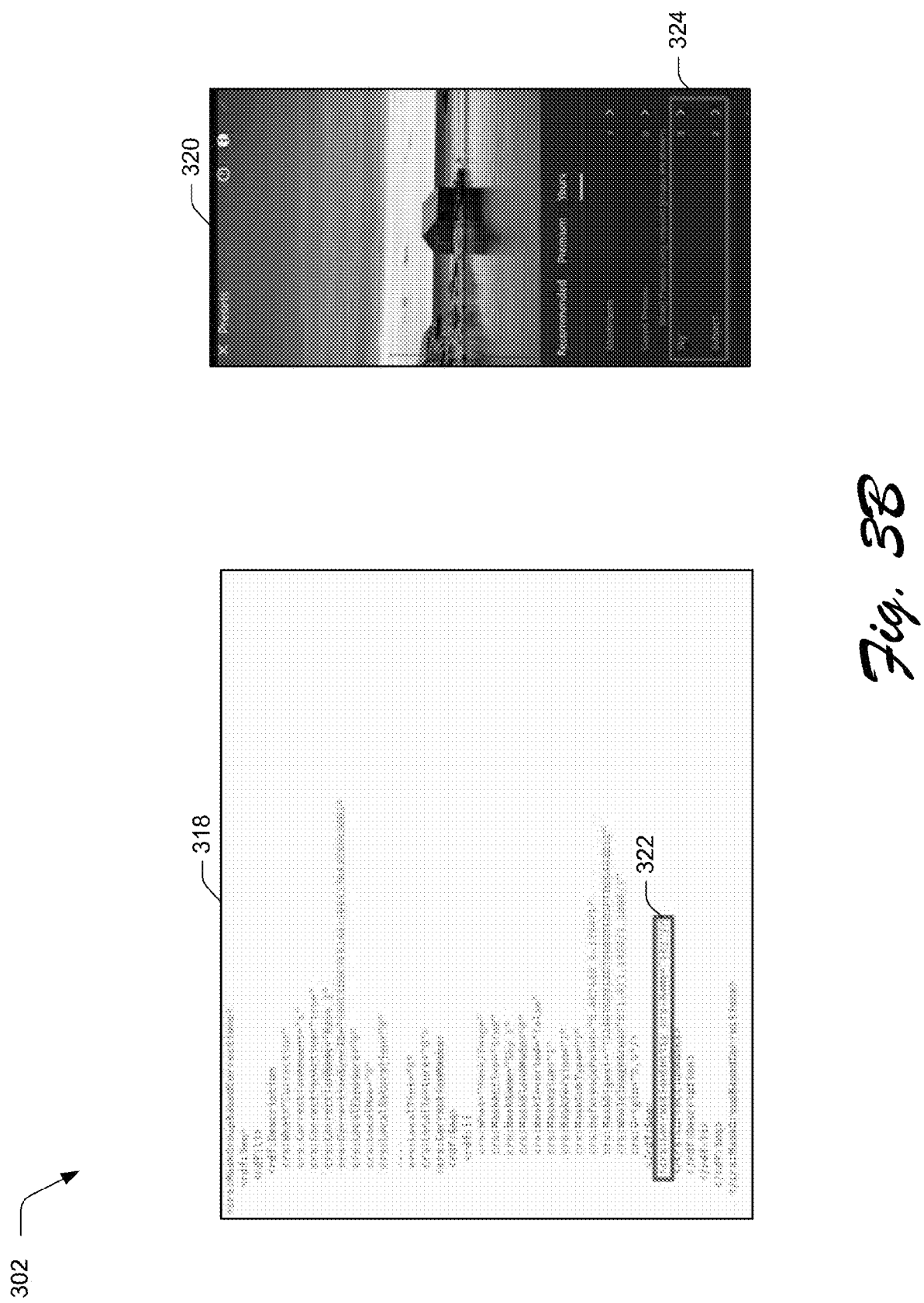

For example, the detection module 202 receives the image data 114 and/or the input data 116, and the detection module 202 processes the image data 114 to generate object data 214. FIGS. 3A, 3B, 3C, and 3D illustrate examples of generating and applying editing presets. FIG. 3A illustrates a representation 300 of detecting and classifying objects in a digital image. FIG. 3B illustrates a representation 302 of determining relevant presets for classified objects depicted in a digital image. FIG. 3C illustrates a representation 304 of editing a digital image by changing a visual appearance of an object depicted in the digital image using a relevant preset. FIG. 3D illustrates a representation 306 of generating a preset based on edits applied to an object depicted in a digital image.

With reference to FIG. 3A, the representation includes a digital image 308 and a processed digital image 310. For instance, the image data 114 describes the digital image 308 which depicts a building disposed on an end of a small peninsula that is partially covered in snow and extends into a body of water. The digital image 308 depicts mountains in the background (behind the building) and a cloudy sky at twilight. There is a band of yellow light still visible in the sky which is above the mountains and below dense cloud cover. The yellow light is also reflected by the body of water. As shown, contrasts between the colors of the light, the snow, the clouds, and the water are not aesthetically pleasing making the digital image 308 difficult to view.

The detection module 202 processes the image data 114 using a machine learning model trained on training data to receive a digital image depicting objects as an input and generate a bounding box, a label vector, and a confidence score for each of the objects as an output. In one example, the machine learning model includes convolutional neural network. For example, the machine learning model is a Faster-RCNN based network (ResNet-101) trained to generate bounding boxes, label vectors, and confidence scores using the Open-Images dataset as training data. In an example, a total of 518 object classifications/categories were included in the training data.

The detection module 202 processes the image data 114 describing the digital image 308 to generate the processed digital image 310. As shown, the detection module 202 detected and classified a sky object, a subject object, and a water object as being depicted in the digital image 308. The processed digital image 310 includes a bounding box 312 and a label vector "Sky" for the sky object; a bounding box 314 and a label vector "Subject" for the subject object; and a bounding box 316 and a label vector "Water" for the water object. The detection module 202 generates the object data 214 as describing the processed digital image 310.

With reference to FIG. 2, the relevancy module 204 receives the object data 214 and the preset data 112, and the relevancy module 204 processes the object data 214 and/or the preset data 112 to generate relevant data 216. As shown in FIG. 3B, the representation 302 includes an extensible metadata platform document 318 and a user interface 320. In one example, the user interface 320 is displayed in the user interface of the application for editing digital content or the user interface 120. The extensible metadata platform document 318 defines a preset described by the preset data 112. For example, the relevancy module 204 compares classifications of the objects detected in the digital image 308 described by the object data 214 to classifications of objects edited to generate presets described by the preset data 112.

The relevancy module 204 identifies classifications of the objects edited to generate the presets that match classifications of the objects detected in the digital image 308. For example, the extensible metadata platform document 318 includes an indication 322 of a "Sky" object edited to generate the preset defined by the extensible metadata platform document 318. The relevancy module 204 determines that the label vector "Sky" for the sky object bounded by the bounding box 312 in the processed digital image 310 matches the indication 322 of the "Sky" object.

For instance, the relevancy module 204 also determines that the label vector "Subject" for the subject object bounded by the bounding box 314 in the processed digital image 310 matches an indication of a "Subject" object included in an additional extensible metadata platform document that defines an additional preset described by the preset data 112. The relevancy module 204 includes the preset defined by the extensible metadata platform document 318 and the additional preset in a list 324 which is organized by unique preset group names and displayed in the user interface 320. For example, the relevancy module 204 generates the relevant data 216 as describing the list 324.

The interface module 206 receives the relevant data 216, the input data 116, the preset data 112, and/or the image data 114, and the interface module 206 processes the relevant data 216, the input data 116, the preset data 112, and/or the image data 114 to generate modified image data 218. With reference to FIG. 3C, the representation 304 includes a modified digital image 326. For example, the user interacts with the input device relative to the user interface 320 to select a user interface element corresponding to the "Sky" object indicated in the list 324 displayed in the user interface 320 which expands the user interface element into user interface elements 328-332. In this example, the user interface element 328 corresponds to a "smoothen" preset described by the preset data 112, the user interface element 330 corresponds to a "sunset" preset defined by the extensible metadata platform document 318 and described by the preset data 112, and the user interface element 332 corresponds to a "sunset reddish" preset described by the preset data 112.

The user manipulates the input device relative to the user interface 120 to select the user interface element 330, and the interface module 206 receives the input data 116 describing the selection of the user interface element 330. For example, the interface module 206 applies pre-defined settings of adjustable editing controls encoded in the "sunset" preset defined by the extensible metadata platform document 318 to the sky object depicted in the digital image 308 to generate the modified digital image 326. To do so in one example, the interface module 206 accesses the preset data 112 and reads the "sunset" preset into a memory to identify that the "Sky" object was edited using the sky select machine learning based mask to generate the "sunset" preset. In this example, the interface module 206 selects or segments all objects depicted in the digital image 308 having classifications that match "Sky" using the sky select machine learning based mask. The interface module 206 then applies pre-defined settings of the "sunset" preset to the selected or segmented objects to generate the modified digital image 326. For example, the interface module 206 applies presets generated using the subject select and skin select machine learning based masks in a same manner as presets generated using the sky select machine learning based mask. For presets generated using the object select machine learning based mask, the interface module 206 uses the classifications of the objects depicted in the digital image 308 to identify corresponding bounding boxes that are passed as regions of interest to a select object model of the application for editing digital content to segment or select an object to modify. For instance, the interface module 206 generates the modified image data 218 as describing the modified digital image 326. The display module 208 receives and processes the modified image data 218 to display the modified digital image 326 in the user interface 120.

As shown in FIG. 3C, the application of the predefined settings of the preset defined by the extensible metadata platform document 318 improves a visual appearance of the sky object in the modified digital image 326 relative to the sky object depicted in the digital image 308. For example, the band of yellow light still visible in the sky at twilight which caused the visually displeasing color contrasts in the digital image 308 has been expanded into the clouds depicted by the sky object in the modified digital image 326. As a result of this visual improvement, the modified digital image 326 appears to depict a sunset scene whereas the digital image 308 appears to depict a twilight scene.

The preset module 110 is also capable of generating presets and including the generated presets in the preset data 112 which is illustrated in the representation 306 of FIG. 3D. As shown, the representation 306 includes a digital image 334 that depicts a dark silhouette of two people sitting on a dock watching a yellow sunset over a body of water. In the illustrated example, the digital image 334 includes a sky object, a people object, and a water object. For example, the image data 114 describes the digital image 334 and the detection module 202 processes the image data 114 to generate the object data 214.

In an example, the object data 214 describes a bounding box for the sky object, a label vector as "sky" for the sky object, and a confidence score for the classification of the sky object; a bounding box for the people object, a label vector as "people" for the people object, and a confidence score for the classification of the people object; and a bounding box for the water object, a label vector as "water" for the water object, and a confidence score for the classification of the water object. The relevancy module 204 receives and processes the object data 214 and the preset data 112 to generate the relevant data 216. To do so in one example, the relevancy module 204 compares the classifications of the objects depicted in the digital image 334 (e.g., the label vectors "sky," "people," and "water") described by the object data 214 to object information included in the extensible metadata platform documents described by the preset data 112.

The relevancy module 204 identifies a group of the extensible metadata platform documents having object information that matches one of the classifications of the objects depicted in the digital image 334. For instance, the relevancy module 204 includes a preset corresponding to each extensible metadata platform document in the group in a list of relevant presets, and the relevancy module 204 generates the relevant data 216 as describing the list of relevant presets. The interface module 206 receives the relevant data 216, the input data 116, and/or the preset data 112.

In a first example, the user manipulates the input device to interact in the user interface of the application for editing digital content relative to the digital image 334 to select the sky object. In this first example, the input data 116 describes coordinates of the user interface of the application for editing digital content. For instance, the coordinates correspond to a touchpoint in examples in which the input device is a stylus or a touchscreen. In an example in which the input device is a mouse, the coordinates correspond to a mouse click.

In order to determine that an object selected by the user is the sky object, the interface module 206 leverages the machine learning based masks that are included as part of functionality made available by the application for editing digital content. The interface module 206 selects or segments the sky object using a sky select machine learning based mask. The interface module 206 also selects or segments the people object using a people select machine learning based mask. The interface module 206 additionally selects or segments the water object using a water select machine learning based mask.

For example, the interface module 206 determines a list of candidate objects for the object selected by the user by identifying which bounding boxes of the bounding box for the sky object, the bounding box for the people object, and the bounding box for the water object contain the coordinates described by the input data 116. In one example, the interface module 206 determines the list of candidate objects as including the sky object because its corresponding bounding box contains the coordinates and also the people object because its corresponding bounding box also contains the coordinates. The interface module 206 then determines whether a type of machine learning based mask for each object in the list of candidate objects contains a non-zero pixel value at the coordinates. For instance, the interface module 206 determines that the sky select machine learning based mask contains a non-zero pixel value at the coordinates and the people select machine learning based mask contains a zero pixel value at the coordinates. In one example, the interface module 206 determines that the object selected by the user is the sky object based on the sky select machine learning based mask containing the non-zero pixel value at the coordinates.

Continuing the first example, the interface module 206 uses the label vector of "sky" for the sky object to determine a subset of the list of relevant presets described by the relevant data 216 that is relevant to the sky object by including presets in the subset that have object information which matches the label vector of "sky" for the sky object. The interface module 206 displays an indication of each preset included in the subset in the user interface of the application for editing digital content relative to the digital image 334. The user is capable of selecting a displayed indication by manipulating the input device which causes a corresponding preset to be applied to the sky object. However, in this first example, the user does not select a displayed indication.

Consider a second example in which the user interacts with the input device relative to the user interface for editing digital content to segment or select the sky object using the sky select machine learning based mask. For example, the sky select machine learning based mask defines an area of an edited region of the digital image 334. In this second example, the interface module 206 determines which object of the sky object, the people object, and the water object is to be edited to generate a preset by computing an intersection over union between the sky select machine learning based mask and the bounding boxes for the sky, people, and water objects. For instance, the object is determined based on an area of overlap between the bounding boxes for the sky, people, and water objects and the area of the edited region of the digital image 334. Since the bounding box for the sky object has a greatest intersection over union with the sky select machine learning based mask, the interface module 206 determines that the sky object is the object to be edited to generate the preset.

Continuing the second example, after segmenting or selecting the sky object using the sky select machine learning based mask, the user manipulates the input device relative to the user interface of the application for editing digital content to edit the digital image 334 by manually adjusting settings of editing controls of the application for editing digital content. The interface module 206 receives the input data 116 describing edits performed on the digital image 334, and the interface module 206 applies the manually adjusted settings to the digital image 334 to generate a digital image 336. For example, the input data 116 also describes the sky select machine learning mask as being a type of machine learning mask used to segment or select the sky object. As shown, the manually adjusted settings have improved a visual appearance of the sunset which is depicted as yellow in the digital image 334 and which is depicted as red in the digital image 336.

The interface module 206 displays a user interface 338 for generating presets in the user interface of the application for editing digital content. The user manipulates the input device relative to the user interface 338 to generate a preset for the manually adjusted settings. As shown, the user interface 338 includes an input field 340 which prompts the user to provide a preset name for the preset for the manually adjusted settings. The user interacts with the input device to specify the preset name as "sunset" and then manipulates the input device to select a user interface element of the user interface 338 which causes the interface module 206 to generate the preset for the manually adjusted settings.

To do so, the interface module 206 generates an extensible metadata platform document 342 which encodes the manually adjusted settings and also includes an indication of the sky select machine learning based mask used to select and edit the sky object to generate the digital image 336. The interface module 206 includes the preset name "sunset" as object information 344 in the extensible metadata platform document 342. For instance, the interface module 206 determines a preset group for the preset for the manually adjusted settings as having a name of "sky." This is because the sky select machine learning based mask was used to select and edit the sky object. For example, the interface module 206 includes the preset group name "sky" as preset group information 346 in the extensible metadata platform document 342.

If a subject select machine learning based mask was used to generate the preset for the manually adjusted settings instead of the sky select machine learning based mask, then the interface module 206 would determine the preset group name as "subject." If an object select machine learning based mask was used to generate the preset for the manually adjusted settings instead of the sky select machine learning based mask, then the interface module 206 would determine the preset group name as "sky" based on the classification of the sky object. If a skin select machine learning based mask was used to generate the preset for the manually adjusted settings instead of the sky select machine learning based mask, then the interface module 206 would determine the preset group name as a type of skin edited such as "eye," "hair," "lips," "beard," "teeth," "clothe," "background," and so forth.

The interface module 206 includes the extensible metadata platform document 342 in the preset data 112. In this manner, the preset for the manually adjusted setting is available to apply to any number of additional objects depicted in digital images. For example, the user interacts with the input device relative to the user interface of the application for editing digital content to apply the preset for the manually adjusted settings to an object depicted in an additional digital image. In another example, the user interacts with the input device relative to the user interface of the application for editing digital content to automatically apply the preset for the manually adjusted settings to each sky or sunset object depicted in digital images included in a group of digital images.

In general, functionality, features, and concepts described in relation to the examples above and below are employed in the context of the example procedures described in this section. Further, functionality, features, and concepts described in relation to different figures and examples in this document are interchangeable among one another and are not limited to implementation in the context of a particular figure or procedure. Moreover, blocks associated with different representative procedures and corresponding figures herein are applicable individually, together, and/or combined in different ways. Thus, individual functionality, features, and concepts described in relation to different example environments, devices, components, figures, and procedures herein are usable in any suitable combinations and are not limited to the particular combinations represented by the enumerated examples in this description.

Example Procedures

The following discussion describes techniques which are implementable utilizing the previously described systems and devices. Aspects of each of the procedures are implementable in hardware, firmware, software, or a combination thereof. The procedures are shown as a set of blocks that specify operations performed by one or more devices and are not necessarily limited to the orders shown for performing the operations by the respective blocks. In portions of the following discussion, reference is made to FIGS. 1-3. FIG. 4 is a flow diagram depicting a procedure 400 in an example implementation in which input data is received describing properties of an editing operation performed in an edited region of a digital image and the properties of the editing operation are applied to a detected object that is depicted in an additional digital image.

Objects depicted in a digital image that is displayed in a user interface of an application for editing digital content are detected (block 402). The computing device 102 implements the preset module 110 to detect the objects depicted in the digital image in an example. Input data describing an edited region of the digital image and properties of an editing operation performed in the edited region is received (block 404). For example, the preset module 110 receives the input data.

A particular detected object of the detected objects is identified based on a bounding box of the particular detected object and an area of the edited region (block 406). In an example, the computing device 102 implements the preset module 110 to identify the particular detected object. An additional digital image is edited by applying the properties of the editing operation to a detected object that is depicted in the additional digital image based on a classification of the detected object and a classification of the particular detected object (block 408). In some examples, the preset module 110 edits the additional digital image.

Figure 5D:
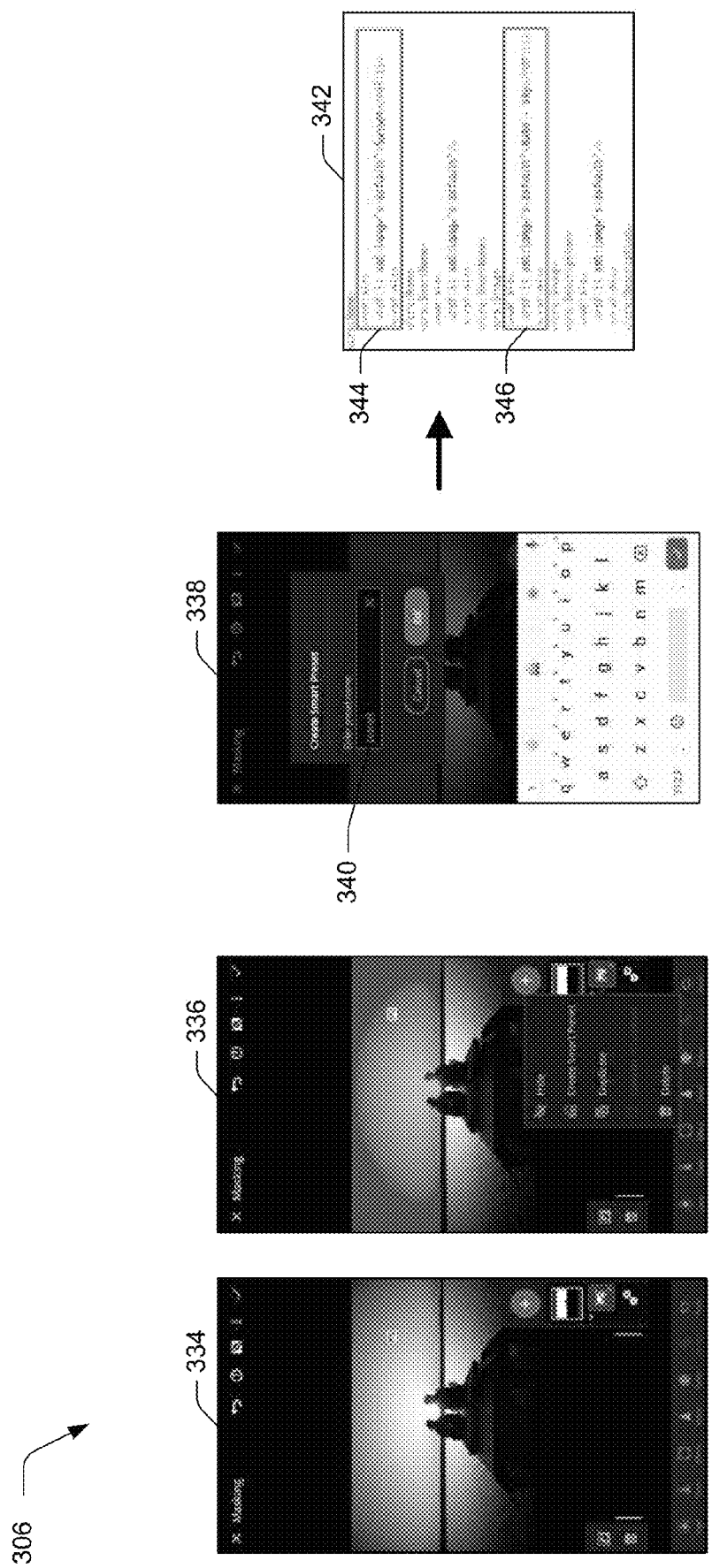
FIG. 5 illustrates a representation of editing presets applied to a digital image.
Figure 5:
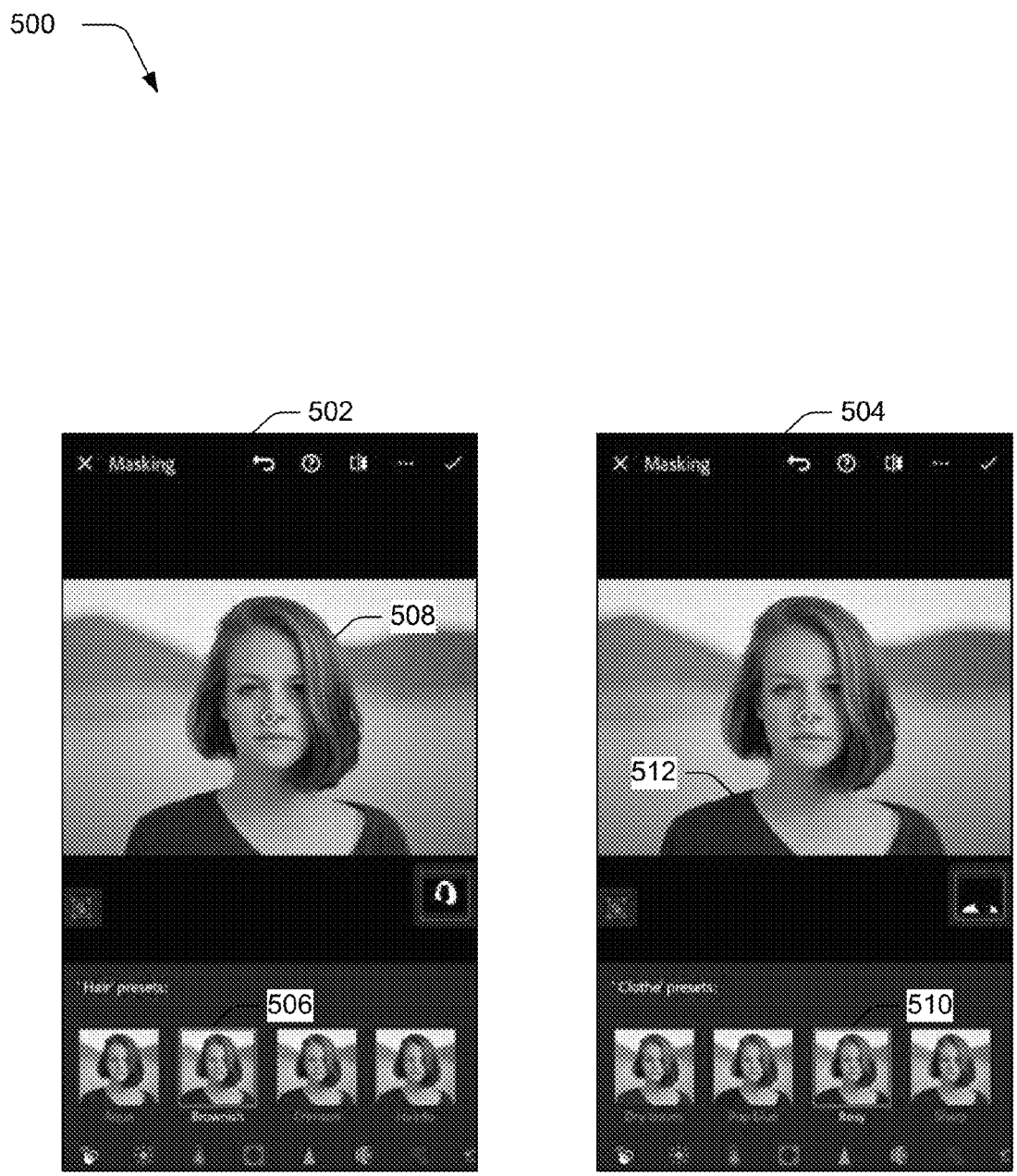

FIG. 5 illustrates a representation 500 of editing presets applied to a digital image. The representation 500 includes a first example 502 and a second example. In the first example 502, a user interacts with an input device relative to a user interface of an application for editing digital content to select a user interface element 506. The preset module 110 receives input data 116 describing the selection of the user interface element 506, and the preset module 110 uses a hair select machine learning based mask to apply a hair color preset to a hair object 508. In the second example 504, the user interacts with the input device relative to the user interface of the application for editing digital content to select a user interface element 510. For example, the preset module 110 receives input data describing the selection of the user interface element 510 and the preset module 110 uses a clothe select machine learning based mask to apply a clothe preset to a garment object 512.

Figure 6:
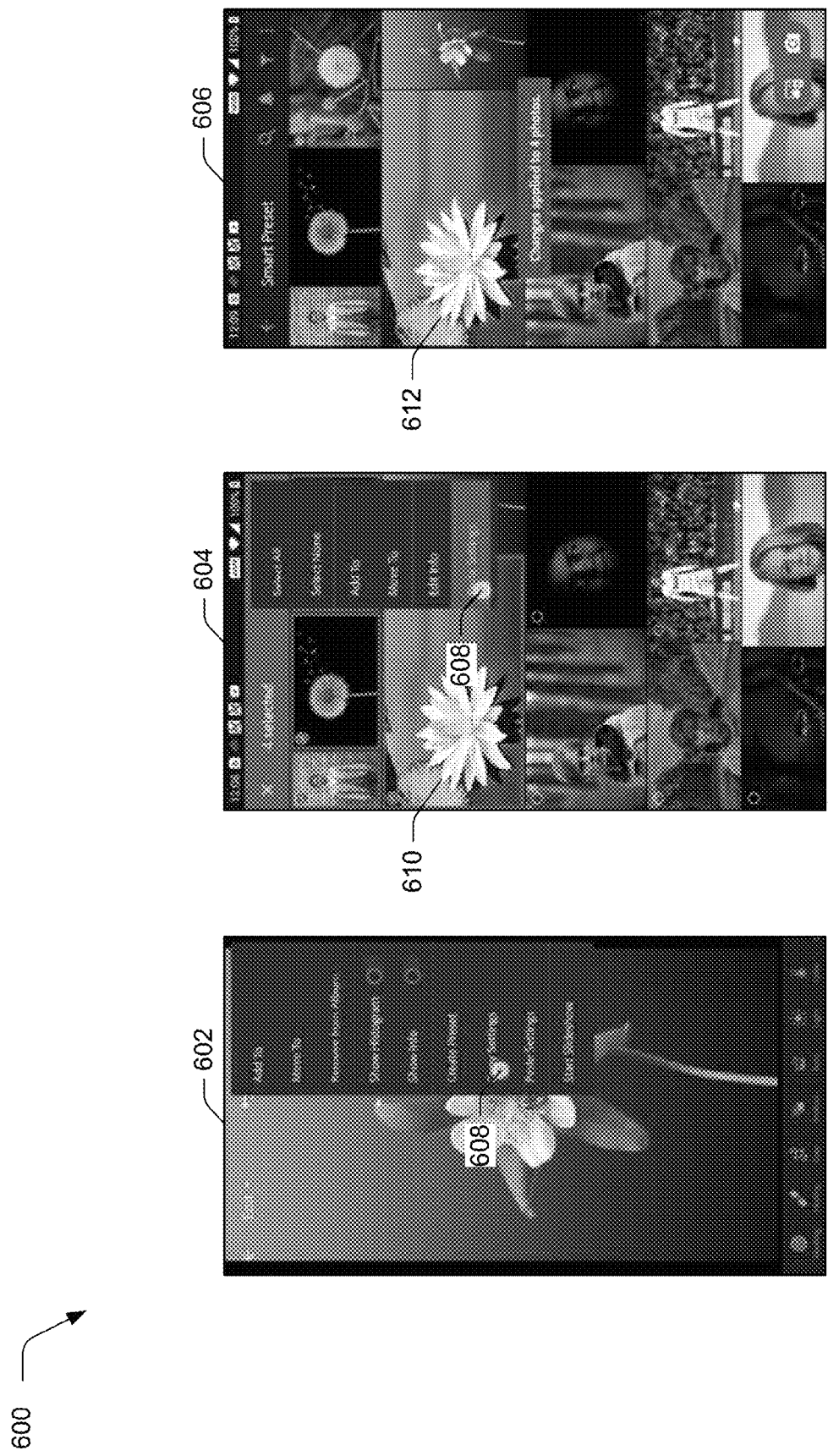
FIG. 6 illustrates a representation of a user interface for generating and applying editing presets.

FIG. 6 illustrates a representation 600 of a user interface for generating and applying editing presets. The representation 600 includes a first example 602, a second example 604, and a third example 606. In the first example 602, a user interacts with an input device relative to a user interface of an application for editing digital content to select a user interface element 608. The preset module 110 receives input data 116 describing the selection of the user interface element 608, and the preset module 110 determines settings of adjustable editing controls of an application for editing digital content that are applied to a subject object depicted in a digital image. The preset module 110 encodes the settings of adjustable editing controls as a preset. In one example, the preset module 110 encodes the settings of adjustable editing controls in an extensible metadata platform document which also includes an indication of a subject select machine learning based mask and a classification of the subject object as a subject object.

In the second example 604, the user interacts with the input device relative to the user interface of the application for editing digital content to select a user interface element 608. The preset module 110 receives input data 116 describing the selection of the user interface element 608, and the preset module 110 identifies an unedited object 610 which is depicted in an additional digital image. In an example, the unedited object 610 is a subject object depicted in the additional digital image. In the third example 606, the additional digital image depicts an edited object 612. For example, the preset module 110 selects or segments the unedited object 610 in the additional digital image using a subject select machine learning based mask and applies the settings of adjustable editing controls encoded in the preset to the unedited object 610 to generate the edited object 612.

Example System and Device

Figure 7:
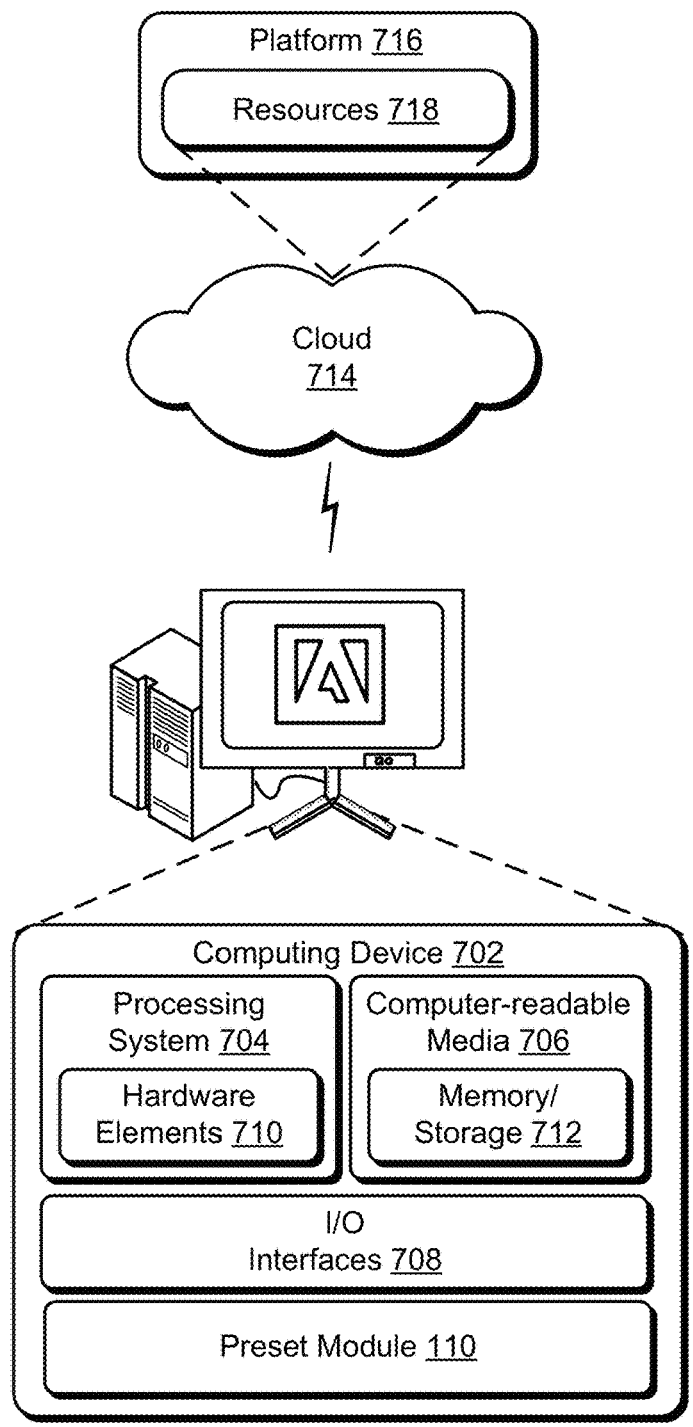
FIG. 7 illustrates an example system that includes an example computing device that is representative of one or more computing systems and/or devices for implementing the various techniques described herein.

FIG. 7 illustrates an example system 700 that includes an example computing device that is representative of one or more computing systems and/or devices that are usable to implement the various techniques described herein. This is illustrated through inclusion of the preset module 110. The computing device 702 includes, for example, a server of a service provider, a device associated with a client (e.g., a client device), an on-chip system, and/or any other suitable computing device or computing system.

The example computing device 702 as illustrated includes a processing system 704, one or more computer-readable media 706, and one or more I/O interfaces 708 that are communicatively coupled, one to another. Although not shown, the computing device 702 further includes a system bus or other data and command transfer system that couples the various components, one to another. For example, a system bus includes any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 704 is representative of functionality to perform one or more operations using hardware. Accordingly, the processing system 704 is illustrated as including hardware elements 710 that are configured as processors, functional blocks, and so forth. This includes example implementations in hardware as an application specific integrated circuit or other logic device formed using one or more semiconductors. The hardware elements 710 are not limited by the materials from which they are formed or the processing mechanisms employed therein. For example, processors are comprised of semiconductor(s) and/or transistors (e.g., electronic integrated circuits (ICs)). In such a context, processor-executable instructions are, for example, electronically-executable instructions.

The computer-readable media 706 is illustrated as including memory/storage 712. The memory/storage 712 represents memory/storage capacity associated with one or more computer-readable media. In one example, the memory/storage 712 includes volatile media (such as random access memory (RAM)) and/or nonvolatile media (such as read only memory (ROM), Flash memory, optical disks, magnetic disks, and so forth). In another example, the memory/storage 712 includes fixed media (e.g., RAM, ROM, a fixed hard drive, and so on) as well as removable media (e.g., Flash memory, a removable hard drive, an optical disc, and so forth). The computer-readable media 706 is configurable in a variety of other ways as further described below.

Input/output interface(s) 708 are representative of functionality to allow a user to enter commands and information to computing device 702, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which employs visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 702 is configurable in a variety of ways as further described below to support user interaction.

Various techniques are described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques are implementable on a variety of commercial computing platforms having a variety of processors.

Implementations of the described modules and techniques are storable on or transmitted across some form of computer-readable media. For example, the computer-readable media includes a variety of media that is accessible to the computing device 702. By way of example, and not limitation, computer-readable media includes "computer-readable storage media" and "computer-readable signal media."

"Computer-readable storage media" refers to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which are accessible to a computer.

"Computer-readable signal media" refers to a signal-bearing medium that is configured to transmit instructions to the hardware of the computing device 702, such as via a network. Signal media typically embodies computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 710 and computer-readable media 706 are representative of modules, programmable device logic and/or fixed device logic implemented in a hardware form that is employable in some embodiments to implement at least some aspects of the techniques described herein, such as to perform one or more instructions. Hardware includes components of an integrated circuit or on-chip system, an application-specific integrated circuit (ASIC), a field-programmable gate array (FPGA), a complex programmable logic device (CPLD), and other implementations in silicon or other hardware. In this context, hardware operates as a processing device that performs program tasks defined by instructions and/or logic embodied by the hardware as well as a hardware utilized to store instructions for execution, e.g., the computer-readable storage media described previously.

Combinations of the foregoing are also employable to implement various techniques described herein. Accordingly, software, hardware, or executable modules are implementable as one or more instructions and/or logic embodied on some form of computer-readable storage media and/or by one or more hardware elements 710. For example, the computing device 702 is configured to implement particular instructions and/or functions corresponding to the software and/or hardware modules. Accordingly, implementation of a module that is executable by the computing device 702 as software is achieved at least partially in hardware, e.g., through use of computer-readable storage media and/or hardware elements 710 of the processing system 704. The instructions and/or functions are executable/operable by one or more articles of manufacture (for example, one or more computing devices 702 and/or processing systems 704) to implement techniques, modules, and examples described herein.

The techniques described herein are supportable by various configurations of the computing device 702 and are not limited to the specific examples of the techniques described herein. This functionality is also implementable entirely or partially through use of a distributed system, such as over a "cloud" 714 as described below.

The cloud 714 includes and/or is representative of a platform 716 for resources 718. The platform 716 abstracts underlying functionality of hardware (e.g., servers) and software resources of the cloud 714. For example, the resources 718 include applications and/or data that are utilized while computer processing is executed on servers that are remote from the computing device 702. In some examples, the resources 718 also include services provided over the Internet and/or through a subscriber network, such as a cellular or Wi-Fi network.

The platform 716 abstracts the resources 718 and functions to connect the computing device 702 with other computing devices. In some examples, the platform 716 also serves to abstract scaling of resources to provide a corresponding level of scale to encountered demand for the resources that are implemented via the platform. Accordingly, in an interconnected device embodiment, implementation of functionality described herein is distributable throughout the system 700. For example, the functionality is implementable in part on the computing device 702 as well as via the platform 716 that abstracts the functionality of the cloud 714.

CONCLUSION

Although implementations of systems for generating and applying editing presets have been described in language specific to structural features and/or methods, it is to be understood that the appended claims are not necessarily limited to the specific features or methods described. Rather, the specific features and methods are disclosed as example implementations of systems for generating and applying editing presets, and other equivalent features and methods are intended to be within the scope of the appended claims. Further, various different examples are described and it is to be appreciated that each described example is implementable independently or in connection with one or more other described examples.

What is claimed is:

1. A method implemented by a computing device, the method comprising:
    generating, by the computing device, input data based on user interaction detected via a user interface to edit a first digital image, the input data describing an edited region of the first digital image and a property of an editing operation performed in the edited region;
    generating, by the computing device, a classification of a first object included in the edited region using machine learning;
    generating, by the computing device, a preset based on the classification, the editing operation, and the property of the editing operation performed in the edited region; and
    editing, by the computing device, a second object in a second digital image by applying the preset with the property to the second object.

2. The method as described in claim 1, further comprising outputting the preset for display in the user interface, the present being selectable via the user interface to initiate the image editing operation using the property to the second object in the second digital image based on the classification.

3. The method as described in claim 2, further comprising describing the classification of the second detected object in a extensible metadata platform document.

4. The method as described in claim 2, further comprising determining a preset group for the preset based on a type of machine learning based mask used to segment the edited region of the first digital image, the edited region being selectable as a mask within the user interface that includes one or more first detected objects in the one or more classifications.

5. The method as described in claim 1, wherein the classification of the second object is similar to the classification of the first object.

6. The method as described in claim 1, wherein the second digital image is edited automatically and without user intervention.

7. The method as described in claim 1, wherein the second digital image is edited in response to a user interaction in the user interface of the application for editing digital content.

8. The method as described in claim 7, wherein the user interaction selects an indication of the editing operation from a list of relevant presets displayed in the user interface based on the classification of the first object.

9. The method as described in claim 1, wherein the first object is identified based on an area of overlap between a bounding box surrounding the first object and the area of the edited region.

10. The method as described in claim 1, wherein the edited region is segmented by a machine learning based mask generated by the application for editing digital content.

11. A system comprising:
    a detection module implemented at least partially in hardware of a computing device to:
        receive image data describing a digital image that is displayed in a user interface of an application for editing digital content; and
        by a machine-learning model detect objects depicted in the first digital image;
    a relevancy module implemented at least partially in the hardware of the computing device to identify presets, based on classifications of the detected objects; and
    an interface module implemented at least partially in the hardware of the computing device to:
        generate input data based on user interaction detected via a user interface to edit a first digital image, the input data describing an edited region of the first digital image and a property of an editing operation performed in the edited region;
        generate a classification of a first object included in the edited region using machine learning;
        generate, a preset based on the classification, the editing operation, and the property of the editing operation performed in the edited region; and
        edit a second object in a second digital image by applying the preset with the property to the second object.

12. The system as described in claim 11, wherein the classification of the second object is similar to the classification of the first object.

13. The system as described in claim 11, wherein the edited region is segmented by a machine learning based mask generated by the application for editing digital content.

14. The system as described in claim 11, wherein the first object is identified based on an area of overlap between a bounding box surrounding the first object and the area of the edited region.

15. The system as described in claim 11, wherein the second digital image is edited automatically and without user intervention.

16. The system as described in claim 11, wherein the second digital image is edited in response to a user interaction in the user interface of the application for editing digital content.

17. One or more non-transitory computer-readable storage media comprising instructions stored thereon that, responsive to execution by a computing device, causes the computing device to perform operations including:
    detecting, objects depicted in a digital image that is displayed in a user interface of an application for editing digital content;

generating input data based on user interaction detected via a user interface to edit a first digital image, the input data describing an edited region of the first digital image and a property of an editing operation performed in the edited region;

generating a classification of a first object included in the edited region using machine learning;

generating a preset based on the classification, the editing operation, and the property of the editing operation performed in the edited region; and editing a second object in a second digital image by applying the preset with the property to the second object.

18. The one or more non-transitory computer-readable storage media of claim 17, wherein the classification of the second object is similar to a classification of the first object.

19. The one or more non-transitory computer-readable storage media of claim 17, wherein the second digital image is edited automatically and without user intervention.

20. The one or more non-transitory computer-readable storage media of claim 17, wherein the edited region is segmented by a machine learning based mask generated by the application for editing digital content.

* * * * *